US010699432B2

(12) United States Patent
Lee

(10) Patent No.: US 10,699,432 B2
(45) Date of Patent: Jun. 30, 2020

(54) DEPTH MAP GENERATION DEVICE FOR MERGING MULTIPLE DEPTH MAPS

(71) Applicant: eYs3D Microelectronics, Co., Taipei (TW)

(72) Inventor: Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 60 days.

(21) Appl. No.: 15/936,451

(22) Filed: Mar. 27, 2018

(65) Prior Publication Data

US 2018/0293748 A1 Oct. 11, 2018

Related U.S. Application Data

(60) Provisional application No. 62/479,331, filed on Mar. 31, 2017.

(51) Int. Cl.
*G06K 9/00* (2006.01)
*G06T 7/593* (2017.01)
(Continued)

(52) U.S. Cl.
CPC ............ *G06T 7/596* (2017.01); *G06T 3/40* (2013.01); *G06T 5/006* (2013.01); *G06T 5/50* (2013.01); *G06T 7/593* (2017.01); *H04N 5/23238* (2013.01); *H04N 13/111* (2018.05); *H04N 13/204* (2018.05); *H04N 13/239* (2018.05); *H04N 13/25* (2018.05); *H04N 13/254* (2018.05); *H04N 13/282* (2018.05); *H04N 13/296* (2018.05); *G06T 2207/10028* (2013.01); *G06T 2207/20221* (2013.01);
(Continued)

(58) Field of Classification Search
CPC . G06T 2207/10028; G06T 2207/20221; G06T 2207/20228; G06T 2219/2016; G06T 3/40; G06T 5/006; G06T 5/50; G06T 7/593; G06T 7/596; H04N 13/204; H04N 13/239; H04N 13/25; H04N 13/282; H04N 13/296; H04N 2013/0081; H04N 5/23238
See application file for complete search history.

(56) References Cited

U.S. PATENT DOCUMENTS

2015/0109415 A1\* 4/2015 Son .................. G01B 11/22
348/46
2015/0170370 A1 6/2015 Ukil
(Continued)

FOREIGN PATENT DOCUMENTS

CN 102609974 A 7/2012
CN 103493482 A 1/2014
(Continued)

*Primary Examiner* — Nirav G Patel
(74) *Attorney, Agent, or Firm* — Winston Hsu

(57) ABSTRACT

A depth map generation device for merging multiple depth maps includes two image capturers, a depth map generator, and a mixer. The two image capturers are used for generating two first images. The depth map generator is coupled to the two image capturers, wherein the depth map generator generates a first depth map and a second depth map according to the two first images. The mixer is coupled to the depth map generator for merging the first depth map and the second depth map to generate a final depth map, wherein the first depth map and the second depth map have different characteristics.

14 Claims, 4 Drawing Sheets

(51) Int. Cl.
*H04N 13/204* (2018.01)
*H04N 13/282* (2018.01)
*H04N 5/232* (2006.01)
*H04N 13/25* (2018.01)
*H04N 13/296* (2018.01)
*H04N 13/239* (2018.01)
*H04N 13/254* (2018.01)
*H04N 13/111* (2018.01)
*G06T 3/40* (2006.01)
*G06T 5/50* (2006.01)
*G06T 5/00* (2006.01)
*H04N 13/00* (2018.01)

(52) U.S. Cl.
CPC ............... *G06T 2207/20228* (2013.01); *G06T 2219/2016* (2013.01); *H04N 2013/0081* (2013.01)

(56) References Cited

U.S. PATENT DOCUMENTS

| | | | |
|---|---|---|---|
| 2018/0322646 A1* | 11/2018 | Matthies | G06K 9/6226 |
| 2018/0335299 A1* | 11/2018 | Shen | G01S 17/46 |

FOREIGN PATENT DOCUMENTS

| | | |
|---|---|---|
| CN | 103942756 A | 7/2014 |
| CN | 104185857 A | 12/2014 |
| CN | 105007475 A | 10/2015 |
| CN | 106068646 A | 11/2016 |
| CN | 106210698 A | 12/2016 |

* cited by examiner

DEPTH MAP GENERATION DEVICE FOR MERGING MULTIPLE DEPTH MAPS

CROSS REFERENCE TO RELATED APPLICATION

This application claims the benefit of U.S. Provisional Application No. 62/479,331, filed on Mar. 31, 2017 and entitled "Camera with Panoramic Image and Depth Information, and Depth Capturing Device and System," the contents of which are incorporated herein by reference.

BACKGROUND OF THE INVENTION

1. Field of the Invention

The present invention relates to a depth map generation device for fusing (merging) multiple depth maps, and particularly to a depth map generation device that can fuse depth maps with at least two characteristics.

2. Description of the Prior Art

Generally speaking, a valid area of a depth map with higher accuracy (e.g. corresponding to a long baseline) is narrower than a valid area of a depth map with lower accuracy (e.g. corresponding to a short baseline), so a user may choose the depth map with lower accuracy because of a requirement of a larger valid area (that is, the depth map with higher accuracy will be given up). Therefore, a depth engine provided by the prior art can enlarge a valid area of a depth map generated by the depth engine through a predetermined conditional judgment. For example, the depth engine can make the depth map generated by the depth engine have lower accuracy through the predetermined conditional judgment, wherein the predetermined conditional judgment corresponds to tradeoff between accuracy and a range of a valid area corresponding to a depth map. That is, the depth engine can either make the depth map generated by the depth engine have larger valid area (but have lower accuracy), or make the depth map generated by the depth engine have smaller valid area (but have higher accuracy) through the predetermined conditional judgment. That is, the depth engine cannot generate a depth map simultaneously with different characteristics (e.g. accuracy and a range of a valid area) through the predetermined conditional judgment. Therefore, the prior art is not a good technical solution for the user.

SUMMARY OF THE INVENTION

An embodiment of the present invention provides a depth map generation device for merging multiple depth maps. The depth map generation device includes two image capturers, a depth map generator, and a mixer. The two image capturers are used for generating two first images. The depth map generator is coupled to the two image capturers, wherein the depth map generator generates a first depth map and a second depth map according to the two first images. The mixer is coupled to the depth map generator for merging the first depth map and the second depth map to generate a final depth map, wherein the first depth map and the second depth map have different characteristics.

Another embodiment of the present invention provides a depth map generation device for merging multiple depth maps. The depth map generation device includes an image capturer, a light source, a depth map generator, and a mixer. The light source is used for emitting structured light, and a first image captured by the image capturer comprises the structured light. The depth map generator is coupled to the image capturer, wherein the depth map generator generates a first depth map and a second depth map according to the first image. The mixer is coupled to the depth map generator for merging the first depth map and the second depth map to generate a final depth map, wherein the first depth map and the second depth map have different characteristics.

Another embodiment of the present invention provides a depth map generation device for merging multiple depth maps. The depth map generation device includes two image capturers and a depth map generator. The image capturer is used for generating two first images. The depth map generator is coupled to the two image capturers, wherein the depth map generator generates a first depth map according to the two first images, and dynamically adjusts a resolution of the two first images to change a characteristic of the first depth map.

The present invention provides a depth map generation device for fusing (merging) multiple depth maps. The depth map generation device utilizes at least two image capturers to generate at least two depth maps corresponding to at least two resolutions or at least two block matching sampling frequencies, wherein the at least two depth maps have at least two characteristics, e.g. the at least two depth maps have different accuracy or different smoothness. In addition, the depth map generation device can also utilize structured light emitted by at least one light source and an image capturer to generate the at least two depth maps corresponding to the at least two resolutions or the at least two block matching sampling frequencies. Then, the present invention can fuse the at least two depth maps with the at least two characteristics to generate a final depth map. Therefore, compared to the prior art, the present invention can enlarge a range of the final depth map, or increase accuracy of the final depth map.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
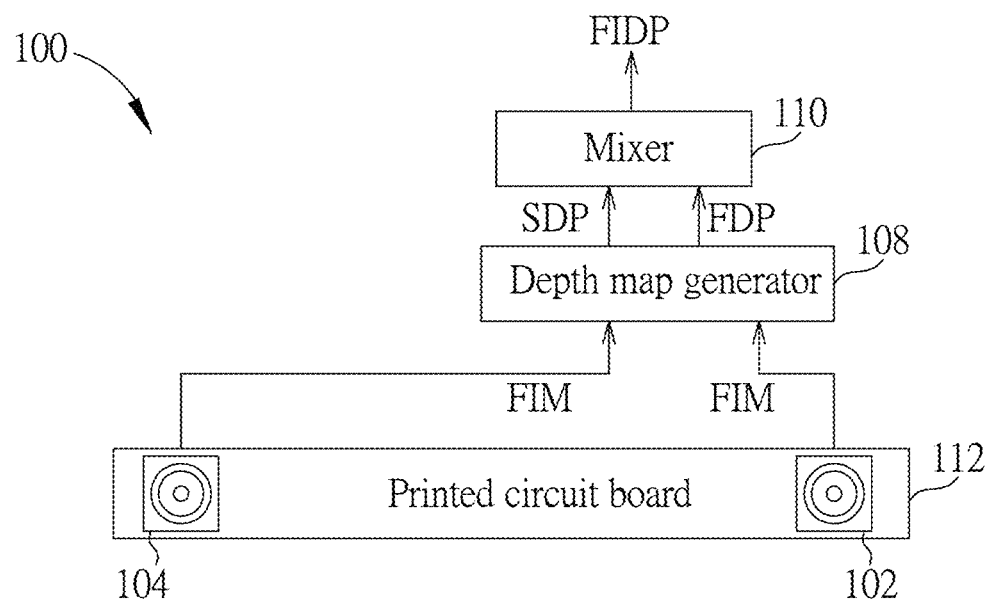
FIG. 1 is a diagram illustrating depth map generation device for merging multiple depth maps according to a first embodiment of the present invention.
Figure 2:
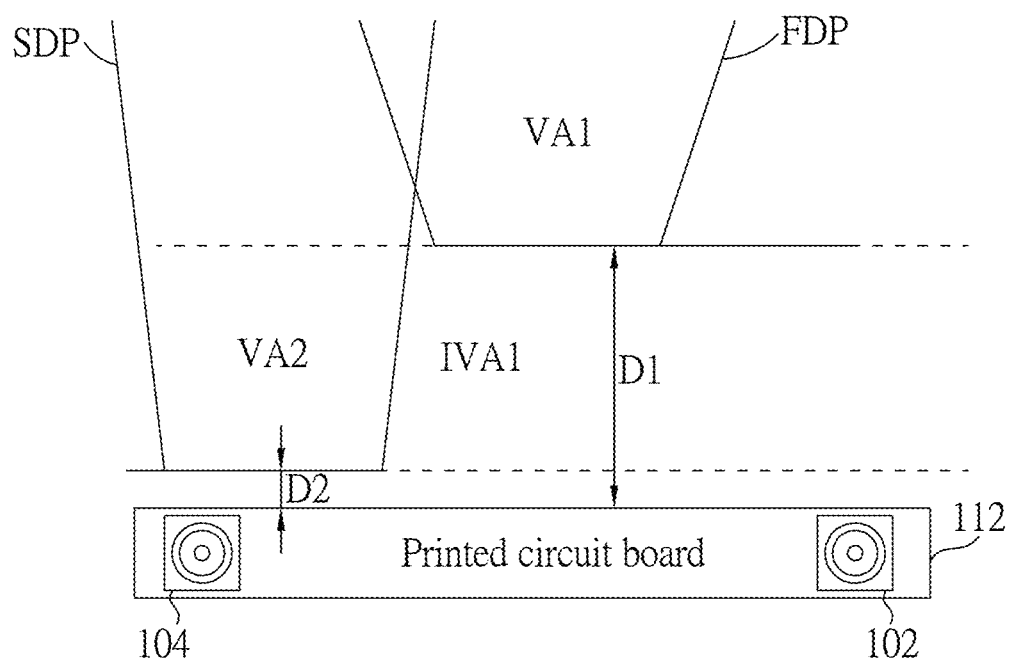
FIG. 2 is a diagram illustrating effective ranges of depth maps corresponding to two different resolutions.

Please refer to FIGS. 1, 2. FIG. 1 is a diagram illustrating depth map generation device 100 for merging multiple depth maps according to a first embodiment of the present invention, and FIG. is a diagram illustrating effective ranges of depth maps corresponding to two different resolutions. As shown in FIG. 1, the depth map generation device 100 includes two image capturers 102, 104, a depth map generator 108, and a mixer 110. But, the present invention is not limited to the depth map generation device 100 only including the two image capturers 102, 104. That is, the depth map generation device 100 can include more than two image capturers. The image capturers 102, 104, the depth map generator 108, and the mixer 110 are installed on a printed circuit board 112. But, for simplifying FIG. 1, only the image capturers 102, 104 are shown on the printed circuit board 112.

The image capturers 102, 104 are used for capturing two first images FIM. As shown in FIG. 1, after the depth map generator 108 receives the two first images FIM, the depth map generator 108 can generate a first depth map FDP according to the two first images FIM. In addition, as shown in FIG. 1, after the depth map generator 108 receives the two first images FIM, the depth map generator 108 can horizontally shrink the two first images FIM to generate two second images, wherein a resolution of the two second images is lower than a resolution of the two first images FIM. Then, the depth map generator 108 can generate a temporary second depth map according to the two second images. After the depth map generator 108 generates the temporary second depth map, the depth map generator 108 can horizontally magnify the temporary second depth map to generate a second depth map SDP. As shown in FIG. 2, because the resolution of the two second images is lower than the resolution of the two first images FIM, a second resolution of the second depth map SDP is lower than a first resolution of the first depth map FDP. That is, accuracy of the first depth map FDP is higher than accuracy of the second depth map SDP, but a valid area of the first depth map FDP is narrower than a valid area of the second depth map SDP. That is, a distance D1 corresponding to a maximum disparity of the first depth map FDP is greater than a distance D2 corresponding to a maximum disparity of the second depth map SDP.

After the first depth map FDP and the second depth map SDP are generated, the mixer 110 electrically connected to the depth map generator 108 can fuse (merge) the first depth map FDP and the second depth map SDP according to a first rule to generate a final depth map FIDP. The first rule includes an invalid area IVA1 of the first depth map FDP (corresponding to the distance D1) being replaced with a valid area VA2 of the second depth map SDP. In addition, an invalid area of a depth map of the present invention can be determined by factors of view angle, baseline, and so on. For example, a disparity d of the first depth map FDP can be determined according to equation (1):

$$d = RES*BL/(Z*2 \tan(FOV/2)) \qquad (1)$$

As shown in equation (1), RES is the first resolution of the first depth map FDP, BL is a baseline between the image capturers 102, 104, FOV is an view angle of the image capturers 102, 104, and Z is a distance corresponding to an object within the first depth map FDP.

But, in another embodiment of the present invention, the first rule includes the invalid area IVA1 of the first depth map FDP and a predetermined contiguous area within the first depth map FDP adjacent to the invalid area IVA1 are replaced with a corresponding valid area of the second depth map SDP to prevent the mixer 110 from generating the final depth map FIDP including a part of the invalid area IVA1 of the first depth map FDP because of an error of the invalid area IVA1 of the first depth map FDP, wherein a range of the predetermined contiguous area can be adjusted according to design requirements or usage scenarios. In addition, when the first depth map FDP and the second depth map SDP are represented by disparity, a disparity of the valid area VA2 of the second depth map SDP needs to be multiplied by a first normalization ratio to match a disparity of the first depth map FDP, wherein the first normalization ratio is determined by equation (2):

$$FNRA = HHL/LHL \qquad (2)$$

As shown in equation (2), FNRA is the first normalization ratio, HHL is a length corresponding to a horizontal direction of the first image FIM, and LHL is a length corresponding to a horizontal direction of the second image, wherein a resolution of the second image is lower than a resolution of the first image FIM. Therefore, the final depth map FIDP will include a valid area VA1 of the first depth map FDP and the valid area VA2 of the second depth map SDP, wherein the disparity of the valid area VA2 is a normalized disparity.

In addition, in another embodiment of the present invention, the depth map generator 108 can first horizontally magnify the two first images FIM to generate the two second images, wherein the resolution of the two second images is higher than the resolution of the two first images FIM. Then, the depth map generator 108 can generate the temporary second depth map according to the two second images, and horizontally shrink the temporary second depth map to generate the second depth map SDP. In addition, in another embodiment of the present invention, the depth map generator 108 can generate the second depth map SDP according to the two second images, and horizontally shrink the first depth map FDP to match the second depth map SDP.

In addition, the depth map generator 108 can be a field programmable gate array (FPGA) with the above mentioned functions of the depth map generator 108, or an application-specific integrated circuit (ASIC) with the above mentioned functions of the depth map generator 108, or a software module with the above mentioned functions of the depth map generator 108. In addition, the mixer 110 can be a field programmable gate array with the above mentioned functions of the mixer 110, or an application-specific integrated circuit with the above mentioned functions of the mixer 110, or a software module with the above mentioned functions of the mixer 110. In addition, in another embodiment of the present invention, the depth map generator 108 and the mixer 110 can be integrated into a processor, wherein the processor can be a field programmable gate array with the above mentioned functions of the depth map generator 108 and the mixer 110, or an application-specific integrated circuit with the above mentioned functions of the depth map generator 108 and the mixer 110, or a software module with the above mentioned functions of the depth map generator 108 and the mixer 110.

In addition, in another embodiment of the present invention, after the depth map generator 108 receives the two first images FIM, the depth map generator 108 can also generate a first depth map and a second depth map by changing block matching resolutions (that is, block matching sampling frequencies), wherein a resolution of the first depth map is different from a resolution of the second depth map. Taking a first block matching sampling frequency being greater a second block matching sampling frequency as an example, the depth map generator 108 can execute block matching on the two first images FIM according to the first block matching sampling frequency and the second block matching sampling frequency to generate the first depth map corresponding to the first block matching sampling frequency and the second depth map corresponding to the second block matching sampling frequency. Because the first block matching sampling frequency is greater than the second block matching sampling frequency, a resolution of the first depth map corresponding to the first block matching sampling frequency is greater than a resolution of the second depth map corresponding to the second block matching sampling frequency, wherein an effective range of the first depth map corresponding to the first block matching sampling frequency and an effective range of the second depth map corresponding to the second block matching sampling frequency can be referred to FIG. 2. In addition, the mixer 110 can fuse the first depth map corresponding to the first block matching sampling frequency and the second depth map corresponding to the second block matching sampling frequency according to the first rule. For example, the first rule includes an invalid area of the first depth map being replaced with a valid area of the second depth map. But, in another embodiment of the present invention, the invalid area of the first depth map and a predetermined contiguous area within the first depth map adjacent to the invalid area of the first depth map are replaced with a corresponding valid area of the second depth map to prevent the mixer 110 from generating a final depth map including a part of the invalid area of the first depth map because of an error of the invalid area of the first depth map, wherein a range of the predetermined contiguous of the first depth map can be adjusted according to design requirements or usage scenarios. In addition, when the first depth map corresponding to the first block matching sampling frequency and the second depth map corresponding to the second block matching sampling frequency are represented by disparity, a disparity of the effective area of the second depth map corresponding to the second block matching sampling frequency needs to be multiplied by a second normalization ratio to match a disparity of the first depth map corresponding to the first block matching sampling frequency, wherein the second normalization ratio is determined by equation (3):

$$SNRA = FSR/SSR \quad (3)$$

As shown in equation (3), SNRA is the second normalization ratio, FSR is the first block matching sampling frequency, and SSR is the second block matching sampling frequency.

Figure 3:
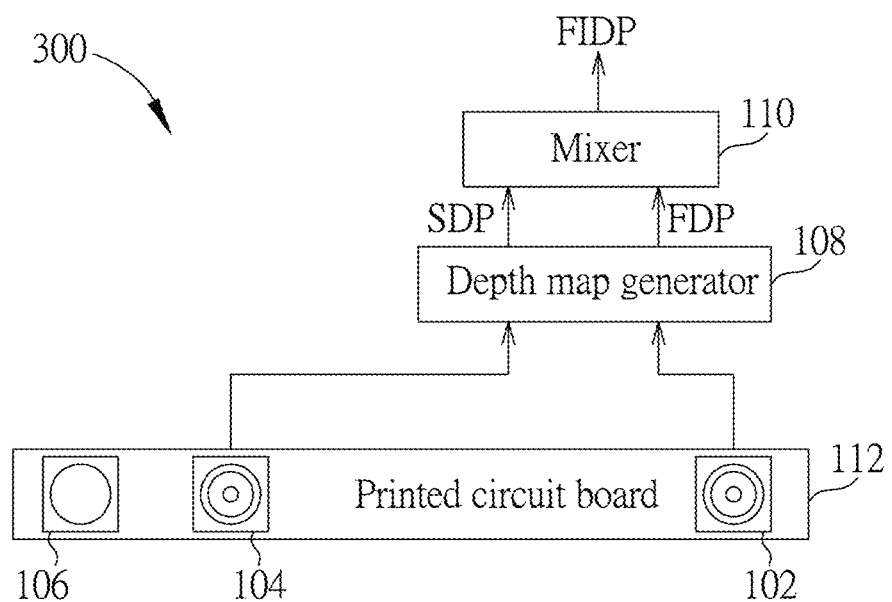
FIG. 3 is a diagram illustrating a depth map generation device for merging multiple depth maps according to a second embodiment of the present invention.

Please refer to FIG. 3. FIG. 3 is a diagram illustrating a depth map generation device 300 for merging multiple depth maps according to a second embodiment of the present invention, wherein the depth map generation device 300 includes image capturers 102, 104, a light source 106, a depth map generator 108, and a mixer 110, and the light source 106 is used for increasing quality of the first depth map FDP and the second depth map SDP generated by the depth map generator 108. But, the present invention is not limited to the depth map generation device 300 only including the light source 106. That is, the depth map generation device 300 can include more than one light source. In addition, operational principles of the image capturers 102, 104, the depth map generator 108, and the mixer 110 of the depth map generation device 300 can be referred to operational principles of the image capturers 102, 104, the depth map generator 108, and the mixer 110 of the depth map generation device 100, so further description thereof is omitted for simplicity.

In one embodiment of the present invention, the light source 106 is an infrared light source for emitting structured light. But, the present invention is not limited to the light source 106 being an infrared light source. That is, the light source 106 can be other type of light sources (e.g. the light source 106 can be a visible light source). Or, in another embodiment of the present invention, the depth map generation device 300 can also include at least one infrared laser light source. In addition, in one embodiment of the present invention, the light source 106 can be turned on according to at least one of luminance of an environment which the depth map generation device 300 is located at, the quality of the first depth map FDP (or the second depth map SDP), and a difference of the first depth map FDP (or the second depth map SDP) corresponding to turning-on and turning-off of the light source 106.

When the light source 106 is turned on according to the luminance of the environment which the depth map generation device 300 is located at, a controller (not shown in FIG. 3) can determine the luminance of the environment which the depth map generation device 300 is located at according to at least one of a shutter time, an exposure time, and an ISO gain currently set by the image capturer 102 (or the image capturer 104). Taking the exposure time as an example, in one embodiment of the present invention, when the shutter time of the image capturer 102 is fixed (or the image capturer 102 has no shutter), the controller can determine whether to turn on the light source 106 according to a value GEX generated by equation (4):

$$GEX = gain*EXPT \quad (4)$$

As shown in equation (4), "gain" shown in equation (4) is the ISO gain corresponding to the image capturer 102 and "EXPT" shown in equation (4) is the exposure time corresponding to the image capturer 102. When the value GEX is greater than a high threshold value, it means that the luminance of the environment which the depth map generation device 300 is located at is too dark, so the controller turns on the light source 106; and when the value GEX is less than a low threshold value, it means that the luminance of the environment which the depth map generation device 300 is located at is bright enough, so the controller turns off the light source 106, wherein the high threshold value is greater than the low threshold value. In addition, when a maximum value of the value GEX (corresponding to a maximum exposure time and a maximum gain of the image capturer 102) cannot be greater than the high threshold value, the controller can turn on the light source 106 according to current luminance of the environment which the depth map generation device 300 is located at.

When the light source 106 is turned on according to the quality of the first depth map FDP, the controller can determine the quality of the first depth map FDP according to at least one of a number of pixels with invalid values within the first depth map FDP and smoothness of the first depth map FDP. For example, in one embodiment of the present invention, the controller can determine whether to turn on the light source 106 according to a cost value COST generated by equation (5):

$$COST = a*mean(HPF(x)) + b*invalid\_cnt(x) \quad (5)$$

As shown in equation (5), "HPF(x)" shown in equation (5) corresponds to a response of a high pass filter (because the smoothness of the first depth map FDP corresponds to high frequency areas of the first depth map FDP), "mean (HPF(x))" shown in equation (5) corresponds to an average of the response of the high pass filter (but, in another embodiment of the present invention, "mean(HPF(x))" shown in equation (5) can be replaced with a sum corresponding to the response of the high pass filter), "invalid_cnt (x)" shown in equation (5) represents the number of the pixels of with the invalid values, "x" shown in equation (5) represents the first depth map FDP, and "a, b" shown in equation (5) are coefficients. When the cost value COST is greater than a threshold value, it means that the luminance of the environment which the depth map generation device 300 is located at is too dark or shot objects within the first depth map FDP have no texture, so the controller turns on the light source 106. In addition, after the light source 106 is turned on for a predetermined time, the controller can attempt to turn off the light source 106 and make the image capturer 102 capture at least one image, and then the controller calculates a cost value corresponding to the at least one image according to equation (5). If the cost value corresponding to the at least one image is still greater than the threshold value, the controller turns on the light source 106 again and executes the above mentioned operation again after the controller turns on the light source 106 for the predetermined time; and if the cost value corresponding to the at least one image is less than the threshold value, the controller turns off the light source 106 until the cost value corresponding to the at least one image is greater than the threshold value again.

In addition, the controller can turn on and turn off the light source 106, and determine the quality of the first depth map FDP according to the difference of the first depth map FDP corresponding to turning-on and turning-off of the light source 106. If the difference of the first depth map FDP corresponding to turning-on and turning-off of the light source 106 is less than a reference value, it means that turning-on and turning-off of the light source 106 does not influence the quality of the first depth map FDP, so the controller can turn off the light source 106.

In addition, after the light source 106 is turned on, the controller can optionally adjust intensity of the light source 106 according to luminance corresponding to a plurality of images captured by the image capturers 102, 104 and a target value, wherein the target value is set according to reflection coefficient of a human skin of a user corresponding to the structured light emitted by the light source 106. For example, the controller can generate a luminance distribution map corresponding to the plurality of images according to the plurality of images, and optionally adjust the intensity of the light source 106 according to a percentage of the first depth map FDP occupied by an area corresponding to a maximum luminance value of at least one luminance value within the luminance distribution map greater than the target value. In addition, in another embodiment of the present invention, the controller can generate average luminance corresponding to the plurality of images according to the plurality of images, and optionally adjust the intensity of the light source 106 according to the average luminance and the target value. In addition, in another embodiment of the present invention, the controller can generate a luminance histogram corresponding to a plurality of pixels of the plurality of images according to the plurality of images, and optionally adjust the intensity of the light source 106 according to a median of the luminance histogram and the target value, or according to a quartile of the luminance histogram and the target value.

In addition, in another embodiment of the present invention, after the light source 106 is turned on, the controller can optionally dynamically adjust the intensity of the light source 106 according to a distance between at least one predetermined object within the plurality of images and the image capturer 102 (or the image capturer 104) and a first lookup table, wherein the first lookup table stores relationships between a distance corresponding to an object and the intensity of the light source 106. In addition, in another embodiment of the present invention, the controller can optionally dynamically adjust the intensity of the light source 106 according to the distance between the at least one predetermined object within the plurality of images and the image capturer 102 (or the image capturer 104) and a first correlation formula.

In addition, in another embodiment of the present invention, the controller continuously detects the luminance of the environment which the depth map generation device 300 is located at under the light source 106 being turned off. When the luminance of the environment is brighter, the controller increases the intensity of the light source 106 (when the light source 106 is turned on) according to a second lookup table, wherein the second lookup table stores relationships between the intensity of the light source 106 (when the light source 106 is turned on) and the luminance of the environment. In addition, in another embodiment of the present invention, when the luminance of the environment is brighter, the controller increases the intensity of the light source 106 (when the light source 106 is turned on) according to a second correlation formula.

In addition, in another embodiment of the present invention, after the controller first turns off the light source 106, the controller detects the luminance of the environment. Then, according to an automatic exposure (AE) algorithm well-known to one of ordinary skill in the art, the controller utilizes the exposure time (or at least one of the shutter time, the exposure time, and the ISO gain) of the image capturer 102 (or the image capturer 104) to make the luminance of the environment be reduced to not to interfere with the image capturer 102 (or the image capturer 104), and fixes a current exposure time of the image capturer 102 (or the image capturer 104). Then, the controller turns on the light source 106 and detects the intensity of the light source 106 until the intensity of the light source 106 is up to the target value.

Figure 4A:
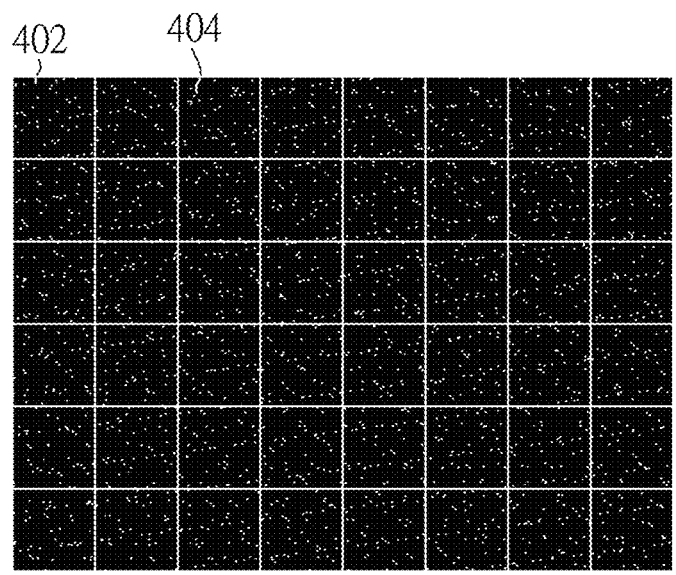
FIG. 4A is a diagram illustrating the first coding pattern.
Figure 4B:
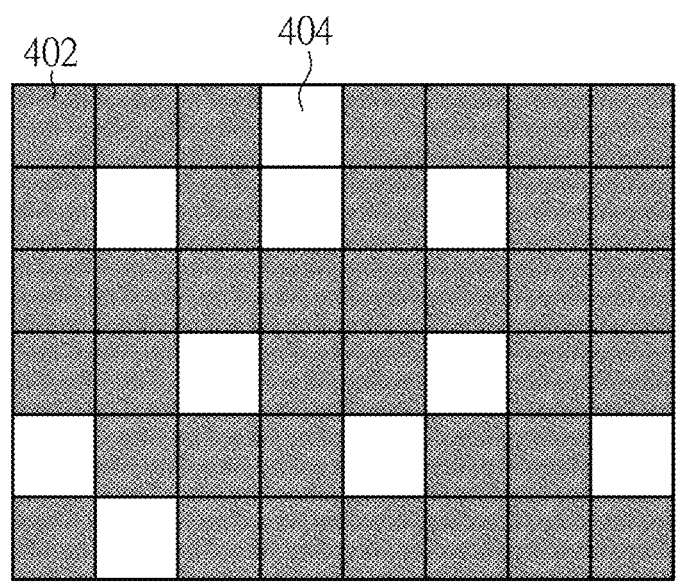
FIG. 4B is a diagram illustrating the second coding pattern.
Figure 5:
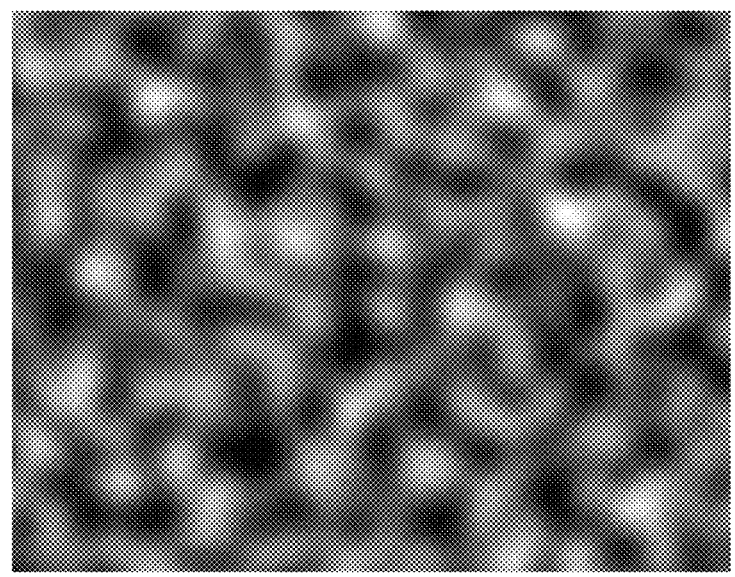
FIG. 5 is a diagram illustrating the third coding pattern.

In addition, in one embodiment of the present invention, the structured light provided by the light source 106 is a coding pattern (corresponding to a random pattern). But, in another embodiment of the present invention, the structured light can combine a first coding pattern with a second coding pattern. Please refer to FIGS. 4A, 4B. FIG. 4A is a diagram illustrating the first coding pattern, and FIG. 4B is a diagram illustrating the second coding pattern. As shown in FIG. 4A, the first coding pattern is divided into a plurality of blocks according to the second coding pattern, and then the second coding pattern is applied to the plurality of blocks to form the structured light. For example, as shown in FIG. 4B, when the second coding pattern is applied to a block 402 of the plurality of blocks, luminance of pixels within the block 402 needs to be reduced. That is, only luminance of pixels within the block 402 being turned on needs to be reduced, and other pixels within the block 402 not being turned on still need to be turned off continuously. In addition, as shown in FIG. 4B, when the second coding pattern is applied to a block 404 of the plurality of blocks, luminance of pixels within the block 404 needs to be increased. That is, only luminance of pixels within the block 404 being turned on needs to be increased, and other pixels within the block 404 not being turned on still need to be turned off continuously to form the structured light. In addition, in another embodiment of the present invention, when the second coding pattern is applied to the plurality of blocks, luminance of pixels within each block of the plurality of blocks being turned on can have multi-level changes. In addition, in another embodiment of the present invention, a third coding pattern shown in FIG. 5 can be also applied to the first coding pattern (as shown in FIG. 4A) to form the structured light.

In addition, in another embodiment of the present invention, the mixer 110 generates the final depth map FIDP according to smoothness of the first depth map FDP and the second depth map SDP. For example, in one embodiment of the present invention, when smoothness of edges of a first block of the first depth map FDP is better than smoothness of edges of a first corresponding block of the second depth map SDP, the final depth map FIDP generated by the mixer 110 will include the first block of the first depth map FDP, wherein the first block and the first corresponding block include at least one pixel; when smoothness of edges of a second block of the first depth map FDP is worse than smoothness of edges of a second corresponding block of the second depth map SDP, the final depth map FIDP generated by the mixer 110 will include the second corresponding block of the second depth map SDP, wherein the second block and the second corresponding block also include at least one pixel. In addition, the mixer 110 can compare the smoothness of the first depth map FDP with the smoothness of the second depth map SDP after or before the normalization is executed on the second depth map SDP. In addition, in another embodiment of the present invention, after the normalization is executed on the disparity of the second depth map SDP, when a difference between an average depth corresponding to a third block of the first depth map FDP and an average depth corresponding to a third corresponding block of the second depth map SDP is greater than a predetermined value, the final depth map FIDP generated by the mixer 110 will include the third corresponding block of the second depth map SDP (because when the difference between the average depth corresponding to the third block of the first depth map FDP and the average depth corresponding to the third corresponding block of the second depth map SDP is greater than the predetermined value, it means that the third block of the first depth map FDP is located at the invalid area IVA1 of the first depth map FDP), wherein the third block and the third corresponding block include at least one pixel; when a difference between an average depth corresponding to a fourth block of the first depth map FDP and an average depth corresponding to a fourth corresponding block of the second depth map SDP is less than the predetermined value, the final depth map FIDP generated by the mixer 110 will include the fourth block of the final depth map FIDP (because the accuracy of the final depth map FIDP is higher than the accuracy of the second depth map SDP), wherein the fourth block and the fourth corresponding block also include at least one pixel. In addition, in another embodiment of the present invention, the mixer 110 generates the final depth map FIDP according to at least one of smoothness of each block of the first depth map FDP and smoothness of each block of the second depth map SDP, an average depth of each block of the first depth map FDP and an average depth of each block of the second depth map SDP, and valid area/invalid area of the first depth map FDP and valid area/invalid area of the second depth map SDP.

Figure 6:
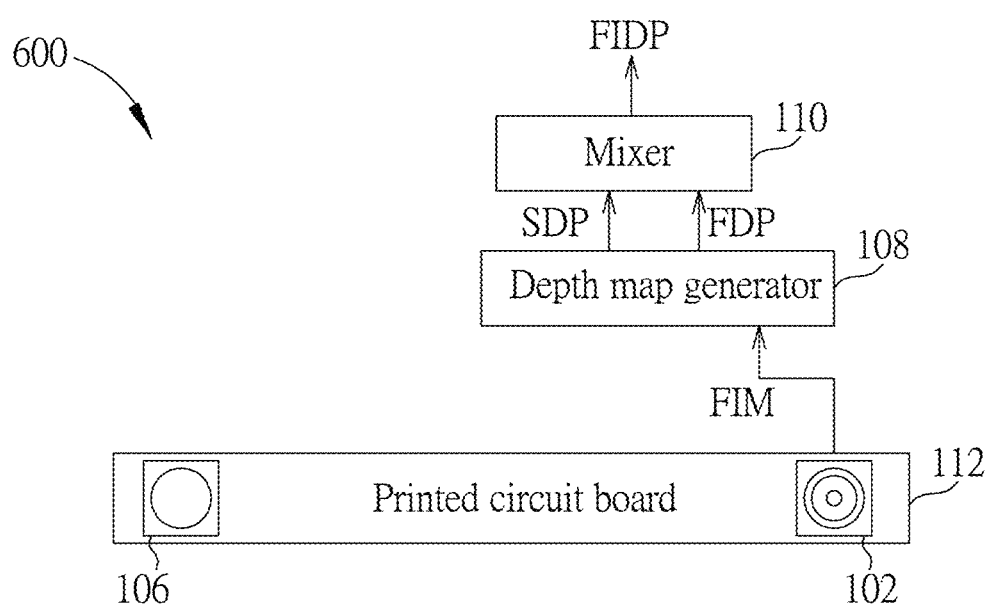
FIG. 6 is a diagram illustrating a depth map generation device for merging multiple depth maps according to a third embodiment of the present invention.

In addition, please refer to FIG. 6. FIG. 6 is a diagram illustrating a depth map generation device 600 for merging multiple depth maps according to a third embodiment of the present invention, wherein the depth map generation device 600 includes the image capturer 102, the light source 106, the depth map generator 108, and the mixer 110. In addition, in another embodiment of the present invention, the depth map generation device 600 can also include more than one image capturer and more than one light source. The image capturer 102 is used for capturing a first image FIM including the structured light. After the depth map generator 108 receives the first image FIM, operational principles of the depth map generator 108 can be referred to the operational principles of the depth map generator 108 of the depth map generation device 100 (e.g. the depth map generator 108 can make the second resolution of the second depth map SDP be lower than the first resolution of the first depth map FDP), so further description thereof is omitted for simplicity.

On the other hand, one embodiment of the present invention further provides a depth map generation device capable of dynamically adjusting resolution, and the depth map generation device includes two image capturers and a depth map generator coupled to the two image capturers, wherein the two image capturers are used for capturing and generating two first images. In addition, the depth map generator can receive the two first images, generate a first depth map according to the two first images, and dynamically adjust the two first images to change accuracy of the first depth map, wherein for example, the depth map generator can dynamically adjust a resolution of the two first images or a block matching sampling frequency corresponding to the two first images to change the accuracy of the first depth map. Thus, the embodiment of the present invention can utilize the first depth map with a predetermined effective range to first detect depth information of an object, then dynamically adjust a resolution of images which are used for generating the first depth map accordingly to change the predetermined effective range of the first depth map, and then detect the depth information of the object again to effectively increase accuracy of the depth information of the object.

To sum up, the depth map generation device provided by the present invention utilizes at least two image capturers to generate at least two depth maps corresponding to at least two resolutions or at least two block matching sampling frequencies, wherein the at least two depth maps have at least two characteristics, e.g. the at least two depth maps have different accuracy or different smoothness. In addition, the depth map generation device can also utilize the structured light emitted by the at least one light source and the image capturer to generate the at least two depth maps corresponding to the at least two resolutions or the at least two block matching sampling frequencies. Then, the present invention can fuse the at least two depth maps with the at least two characteristics to generate the final depth map. Therefore, compared to the prior art, the present invention can enlarge a range of the final depth map, or increase accuracy of the final depth map.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A depth map generation device for merging multiple depth maps, comprising:

two image capturers generating two first images;

a depth map generation circuit coupled to the two image capturers for generating a first depth map and a second depth map, wherein both the first depth map and the second depth map are generated according to the two first images; and a mixing circuit coupled to the depth map generation circuit for merging the first depth map and the second depth map to generate a final depth map, wherein a resolution of the first depth map is different from a resolution of the second depth map, and a resolution of the final depth map comprises the resolution of the first depth map and the resolution of the second depth map.

2. The depth map generation device of claim 1, wherein the depth map generation circuit scales the two first images to generate two second images, and the depth map generation circuit generates the first depth map and the second depth map according to the two first images and the two second images, respectively.

3. The depth map generation device of claim 2, wherein a resolution of the two first images is different from a resolution of the two second images.

4. The depth map generation device of claim 1, wherein the mixing circuit merges the first depth map and the second depth map to generate the final depth map according to smoothness of each block of the first depth map and smoothness of a corresponding block of the second depth map, and both the each block and the corresponding block comprise at least one pixel.

5. The depth map generation device of claim 1, further comprising:
a light source emitting structured light, wherein the two first images comprise the structured light.

6. The depth map generation device of claim 5, wherein the structured light is generated by at least two coding patterns.

7. A depth map generation device for merging multiple depth maps, comprising:
two image capturers generating two first images;
a depth map generation circuit coupled to the two image capturers for utilizing two block matching sampling frequencies to execute block matching on the two first images to generate a first depth map and a second depth map, wherein the first depth map and the second depth map correspond to the two block matching sampling frequencies; and
a mixing circuit coupled to the depth map generation circuit for merging the first depth map and the second depth map to generate a final depth map.

8. A depth map generation device for merging multiple depth maps, comprising:
an image capturer;
a light source emitting structured light, and a first image captured by the image capturer comprises the structured light;
a depth map generation circuit coupled to the image capturer for generating a first depth map and a second depth map, wherein both the first depth map and the second depth map are generated according to the first image; and
a mixing circuit coupled to the depth map generation circuit for merging the first depth map and the second depth map to generate a final depth map, wherein a resolution of the first depth map is different from a resolution of the second depth map, and a resolution of the final depth map comprises the resolution of the first depth map and the resolution of the second depth map.

9. The depth map generation device of claim 8, wherein the depth map generation circuit scales the first image to generate a second image, and the depth map generation circuit generates the first depth map and the second depth map according to the first image and the second image, respectively.

10. The depth map generation device of claim 9, wherein a resolution of the first image is different from a resolution of the second image.

11. The depth map generation device of claim 8, wherein the structured light is generated by at least two coding patterns.

12. The depth map generation device of claim 8, wherein the mixing circuit merges the first depth map and the second depth map to generate the final depth map according to smoothness of each block of the first depth map and smoothness of a corresponding block of the second depth map, and both the each block and the corresponding block comprise at least one pixel.

13. A depth map generation device for merging multiple depth maps, comprising:
an image capturer;
a light source emitting structured light, and a first image captured by the image capturer comprises the structured light;
a depth map generation circuit coupled to the image capturer for utilizing two block matching sampling frequencies to execute block matching on the first image to generate a first depth map and a second depth map, wherein the first depth map and the second depth map correspond to the two block matching sampling frequencies; and
a mixing circuit coupled to the depth map generation circuit for merging the first depth map and the second depth map to generate a final depth map.

14. A depth map generation device, comprising:
two image capturers generating two first images; and
a depth map generation circuit coupled to the two image capturers, wherein the depth map generation circuit generates a first depth map according to the two first images, and dynamically adjusts a resolution of the two first images or a block matching sampling frequency of the two first images to change a first characteristic of the first depth map to generate a second depth map, wherein the first characteristic of the first depth map is different from a second characteristic of the second depth map.

* * * * *